United States Patent
Jang et al.

(10) Patent No.: US 10,804,704 B2
(45) Date of Patent: Oct. 13, 2020

(54) MICROGRID CONTROL SYSTEM AND METHOD FOR THE SAME

(71) Applicant: Korea University Research and Business Foundation, Seoul (KR)

(72) Inventors: Gilsoo Jang, Seoul (KR); Jaewan Suh, Seoul (KR); Donghee Yoon, Daegu (KR); Yunsung Cho, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 293 days.

(21) Appl. No.: 15/259,616

(22) Filed: Sep. 8, 2016

(65) Prior Publication Data
US 2017/0077708 A1   Mar. 16, 2017

(30) Foreign Application Priority Data

Sep. 11, 2015   (KR) .................. 10-2015-0128955

(51) Int. Cl.
| | | |
|---|---|---|
| *G01R 23/15* | (2006.01) | |
| *H02J 3/38* | (2006.01) | |
| *H02J 3/34* | (2006.01) | |
| *H02J 3/02* | (2006.01) | |

(52) U.S. Cl.
CPC ............. *H02J 3/381* (2013.01); *H02J 3/02* (2013.01); *H02J 3/34* (2013.01); *Y02P 80/14* (2015.11)

(58) Field of Classification Search
CPC ..... G01R 23/15; H02J 3/02; H02J 3/34; H02J 3/381; Y02P 80/14

USPC .......................................................... 307/26
See application file for complete search history.

(56) References Cited

U.S. PATENT DOCUMENTS

| | | | | |
|---|---|---|---|---|
| 2008/0143304 A1* | 6/2008 | Bose | ........... | H02J 3/06 323/205 |
| 2013/0073109 A1* | 3/2013 | Cheng | ........... | H02J 3/40 700/298 |
| 2016/0211765 A1* | 7/2016 | Han | ........... | H02M 7/42 |
| 2016/0306372 A1* | 10/2016 | Holveck | ........... | G05F 1/625 |

FOREIGN PATENT DOCUMENTS

| KR | 20120024528 A | 3/2012 |
|---|---|---|
| KR | 101375812 B1 | 3/2014 |

* cited by examiner

*Primary Examiner* — Rexford N Barnie
*Assistant Examiner* — Toan T Vu
(74) *Attorney, Agent, or Firm* — Fox Rothschild LLP

(57) ABSTRACT

A microgrid control system includes a power transmission system configured to supply power to a microgrid, the microgrid configured to receive power from the power transmission system and to supply power to at least one or more distributed generators or into at least one or more loads, a DC converter configured to convert power that is supplied to the microgrid, and a converter control unit configured to measure a first power frequency variation of the microgrid and a second power frequency variation of the power transmission system and to control active power that is transmitted to the microgrid by the DC converter.

5 Claims, 6 Drawing Sheets

MICROGRID CONTROL SYSTEM AND METHOD FOR THE SAME

CROSS-REFERENCE TO RELATED APPLICATIONS

A claim for priority under 35 U.S.C. § 119 is made to Korean Patent Application No. 10-2015-0128955 filed Sep. 11, 2015, in the Korean Intellectual Property Office, the entire contents of which are hereby incorporated by reference.

TECHNICAL FIELD

The present document concerns a microgrid control system and method. More particularly, the present document concerns a microgrid converter droop control system and method for assisting frequency adjustment of power transmission system.

BACKGROUND

Microgrids are small-scale power networks independently supplying power and heat, coming to as new paradigms for power systems along with the rising of small-scale distributed generators using renewable energy in recent years. Microgrids, as a set of a multiplicity of small-scale distributed generators and loads, may be called a small-scale power network which can be connected with or driven independent from an existing power network.

Microgrids are now employed as a power system continuously supplying power into loads of the microgrid by simply using distributed generators in separation from a main system when the main system is in trouble with suspension/short-circuit and serious degradation of power quality.

In consideration of energy self-generation and systemic reliability, the microgrid as a small independent system has a problem that a power transmission system becomes weak when there is frequency fluctuation because loads are incapable of providing electrical inertia and frequency-load reaction to the power transmission system in the case of increasing the engagement of DC distribution or microgrid members connected with a system through a DC converter.

FIG. 1 is a diagram of a general microgrid power frequency control system.

As shown in FIG. 1, a general microgrid power frequency control system includes a first microgrid 20 connected to a power transmission system 10. A controller 40 controls active power of a DC converter 30 in a droop control mode for linearly controlling the system with a specific droop value.

In the case of connecting two or more controllable generators, the droop control mode is a control mode setting load allotment rates of respective generators to be automatically set in accordance with a droop tilt against load variation, preventing a hunting effect and allowing a stable operation of the distributed generators. An active power control amount is determined in Equation 1, as follows, by detecting frequency fluctuation from the microgrid 20 in the system of FIG. 1.

$$f - f_0 = R(P_0 - P) \quad \text{[Equation 1]}$$

In Equation 1, $f_0$ denotes a reference frequency of a microgrid, f denotes a current frequency of the microgrid, R is a droop set value, P denotes active power of a target to be controlled, and $P_0$ denotes active power that is currently being transmitted.

However, the droop control mode does not contribute to adjustment of a systemic frequency because it considers only a frequency operating in a microgrid. For example, controlling active power through such a droop control mode at each of a multiplicity of microgrids connected to a single power transmission system 10 affects the power transmission system 10 and causes a frequency of the power transmission system 10 to fluctuate. Such frequency fluctuation of the power transmission system 10 may also affect a frequency operating in each microgrid.

SUMMARY

The present document concerns a microgrid control system considering both a power transmission system and a microgrid in regard to frequency fluctuation.

The microgrid control system may include a power transmission system configured to supply power to a microgrid, a DC converter, and a converter control unit. The microgrid is configured to receive power from the power transmission system and to supply power into at least one or more distributed generators or into at least one or more loads. The DC converter is configured to convert power that is supplied to the microgrid. The converter control unit is configured to measure a first power frequency variation of the microgrid and a second power frequency variation of the power transmission system and to control active power that is transmitted to the microgrid by the DC converter.

The microgrid control method (performed by a converter control unit controlling an active power amount supplied into a microgrid) may include: measuring a first power frequency variation of the microgrid; measuring a second power frequency variation of a power transmission system; calculating an active power control amount (which is to be supplied to the microgrid) from the first power frequency variation and the second power frequency variation; and controlling a DC converter with the active power control amount.

BRIEF DESCRIPTION OF THE FIGURES

The above and other objects and features will become apparent from the following description with reference to the following figures, wherein like reference numerals refer to like parts throughout the various figures unless otherwise specified.

DETAILED DESCRIPTION

Hereafter, embodiments of the inventive concept will be described in conjunction with the accompanied figures.

Embodiments of the inventive concept may be variable in various forms and the scope of the inventive concept may not be construed as restricting the following embodiments. These embodiments will be provided to help those skilled in the art to fully comprehend the inventive concept as possible. Shapes or patterns of the accompanied figures are exaggerated for more clearly illustrating structural configurations of elements in the figures.

Figure 1:
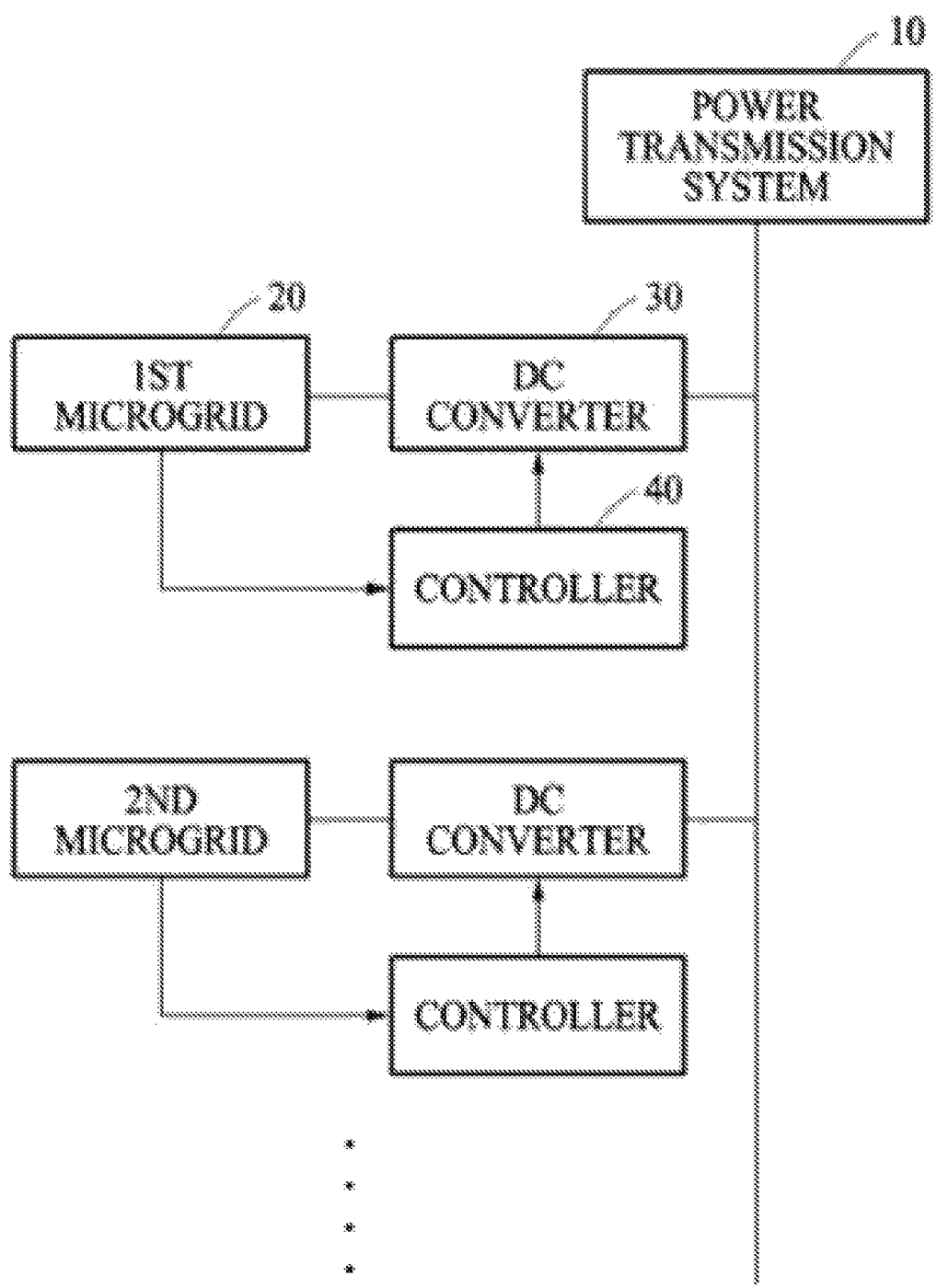
FIG. 1 is a diagram of a general microgrid power frequency control system.
Figure 2:
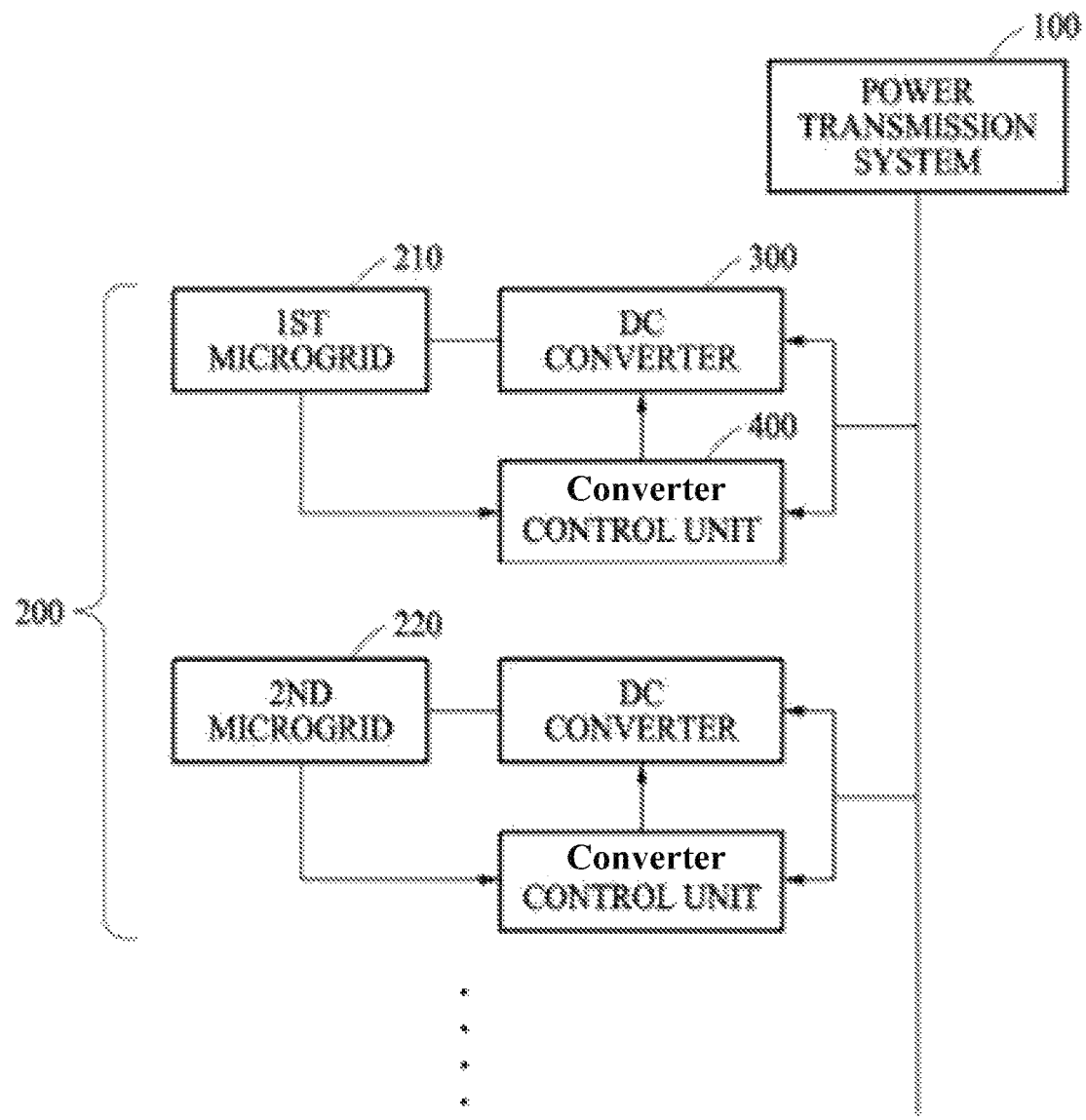
FIG. 2 is a block diagram illustrating a microgrid control system.

FIG. 2 is a block diagram illustrating a microgrid control system.

Figure 3:
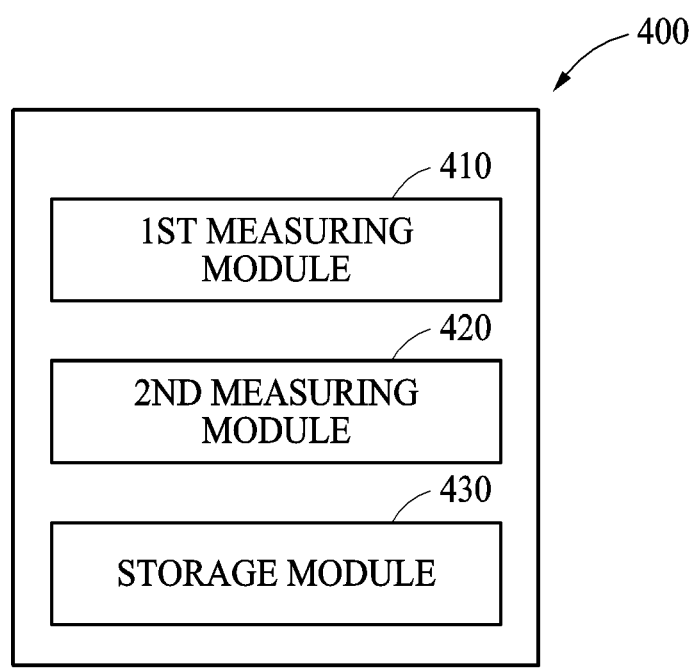
FIG. 3 is a block diagram illustrating a converter control unit.

FIG. 3 is a block diagram illustrating a converter control unit.

As illustrated in FIG. 2, a microgrid control system may include a power transmission system 100 supplying power to a microgrid 200, a DC converter 300, and a converter control unit 400. The microgrid 200 receives power from the power transmission system 100 and supplies power to at least one or more distributed generators or at least one or more loads. The DC converter 300 converts power that is supplied to the microgrid 200. The converter control unit 400 measures a first power frequency variation of the microgrid 200 and a second power frequency variation of the power transmission system 100 and controls active power that is transmitted to the microgrid 200 by the DC converter 300.

The power transmission system 100, generally including lines and facilities for power transmission, may be referred to as a power system formed of many generators and transmission lines.

As illustrated in FIG. 2, the power transmission system 100 may be connected with a multiplicity of microgrids 200, e.g., a first microgrid 210, a second microgrid 220, and so on. A variation of power supply in the power transmission system 100 due to frequency variations at respective microgrids 210, 220, and so on, which is to be described below, may affect other microgrids through the power transmission system 100 due to the frequency variations of the microgrids 210, 220, and so on. The microgrid control system may reflect an effect, which affects the power transmission system due to frequency fluctuation of each microgrid 210, 220, or so on, to frequency variations of other microgrids. Thereby, the power transmission system 100 may be lessened from an excessive burden in operation thereof and the microgrids 210, 220, and so on may be independently controlled with their frequency variations.

Power to be transmitted to the microgrid 200 through the power transmission system 100 may be converted through the DC converter 300 and then the converted power may be supplied to the microgrid 200. The microgrid 200, as a smart grid system allowing self-sufficiency of power in a small-scale local area, may be regarded as a new-generation power system fused and composed with renewable energy resources, for example, solar or wind power, and energy storage units, thus being simply called a small-scale independent power network in a word.

The converter control unit 400 may measure a first power frequency variation, which is a frequency variation of the microgrid 200, and a variation of a second power frequency variation that is a frequency of power transmitted to the DC converter 300 from the power transmission system. The first power frequency variation and the second power frequency variation, which are detected, may be used to control an active power amount of the DC converter 300 (a) to define a frequency variation width of the microgrid 200 within a regulated frequency variation range and (b) to define a regulated frequency variation width of the power transmission system 100 within a regulated frequency variation range of the power transmission system.

The converter control unit 400 may control an active power amount by the droop control described above, and as illustrated in FIG. 3, may include a first measuring module 410 to measure a frequency variation of the microgrid, a second measuring module 420 to measure a frequency variation of the power transmission system 100, and a storage module 430 to receive and store a specific initial droop set value, a microgrid frequency-load characteristic invariable, and a droop control invariable.

As illustrated in FIG. 2, a first power frequency variation, which is a frequency variation of the first microgrid 200 connected to the power transmission system 100, may be measured by the first measuring module 410 of the converter control unit 400. Additionally, a second power frequency variation of the power transmission system 100 may be measured by the second measuring module 420 of the converter control unit 400.

The converter control unit 400 may calculate an active power control amount by using the first power frequency variation and the second power frequency variation. The storage module 430 equipped in the converter control unit 400 may store a specific initial droop value, a microgrid frequency-load characteristic invariable, and a droop control invariable for calculating an active power control amount.

The converter control unit 400 may use factors, which are calculated by the first measuring module 410 and the second measuring module 420 or stored in the storage module 430, to decide an active power control amount with. Such an active power control amount may be calculated by Equation 2 as follows.

$$\Delta P = -\frac{1}{R}\Delta f_s + c_r D_s \Delta f_m \qquad \text{[Equation 2]}$$

In Equation 2, $\Delta P$ denotes an active power control amount, R denotes an initial droop set value, $\Delta f_s$ denotes a frequency variation of the microgrid (a first power frequency variation), $\Delta f_m$ denotes a frequency variation of the power transmission system (a second power frequency variation), $C_r$ denotes a droop control invariable, and $D_s$ denotes a frequency-load characteristic invariable of the microgrid.

The initial droop set value R means a tilt of a linear graph showing a correlation between frequencies and power as like a general droop control mode. A tilt of the linear graph may be set by a device operator.

The droop control invariable $C_r$ may be calculated by Equation 3 as follows.

$$c_r = c_o \frac{\Delta f_s^{reg}}{\Delta f_m^{reg}} \qquad \text{[Equation 3]}$$

In Equation 3, $C_o$ denotes a specific frequency adjustment contribution set value, $\Delta f_s^{reg}$ denotes a regulated frequency variation range of the microgrid, and $\Delta f_m^{reg}$ denotes a regulated frequency variation range of the power transmission system.

$C_o$ is determined by an operator. A larger $C_o$ may positively affect the power transmission system. While a regulated frequency variation range of the microgrid and a regulated frequency variation range of the power transmission system may be also set by an operator, it is general to regulate the ranges in the scope not to affect each system.

For example, it may be permissible to set a regulated microgrid frequency range of the microgrid (i.e., microgrid frequency variation range) in ±0.1 Hz and a regulated frequency variation range of the power transmission system (i.e., power transmission system frequency variation range) in ±0.5 Hz.

The microgrid frequency-load characteristic invariable $D_s$ is valued by entirely reflecting characteristics of loads practically connected to the microgrid. For example, assuming that a load connected to the microgrid is a rotation motor, $D_s$ may become a value entirely counting a reaction, such as a decrease of the number of rotations of the rotation motor according to frequency fluctuation of the microgrid, into the characteristics of a system. Namely, $D_s$ means a value showing physical characteristics of a distributed generator or load according to frequency fluctuation of the microgrid. The microgrid frequency-load characteristic invariable $D_s$ is a factor set on operation in accordance with the number or characteristics of distributed generators or loads which are connected to the microgid, and may be calculated by an operator who knows the characteristics of a system.

A microgrid control system may control the DC converter 300, which is connected with the microgrid 200, to prepare power frequency fluctuation of the microgrid, and additionally, may decide an active power control amount of the DC converter 300 in consideration of the power frequency fluctuation of the power transmission system 100 at the same time.

Figure 4:
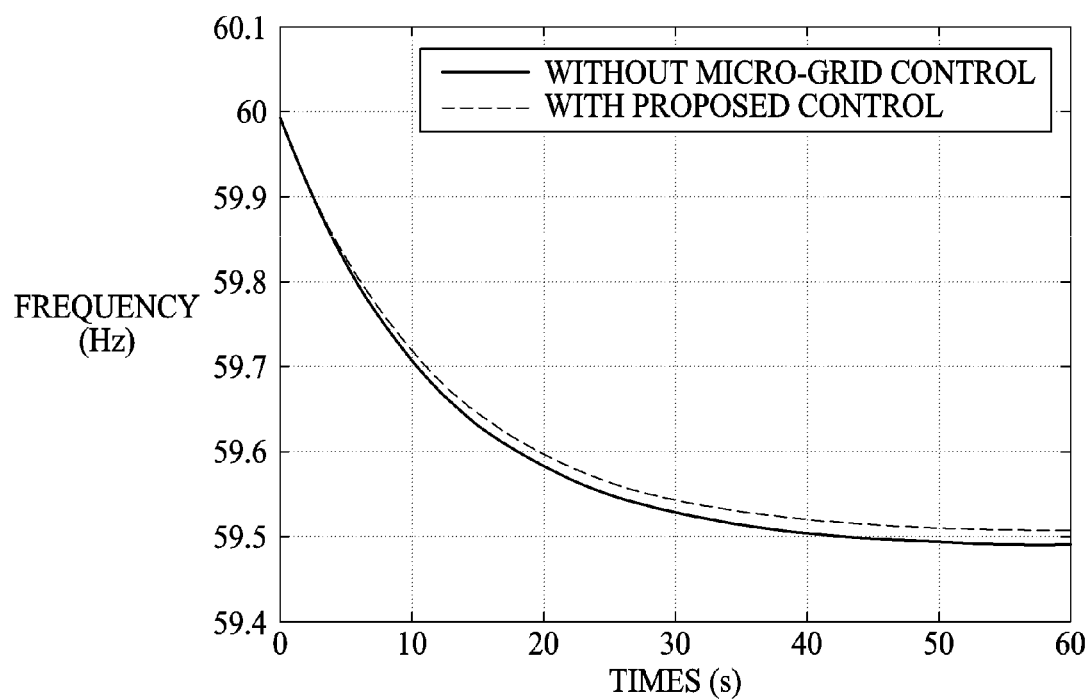
FIG. 4 is a graphic diagram comparing frequency differences in a power transmission system.

FIG. 4 is a graphic diagram comparing frequency differences of a power transmission system.

Figure 5:
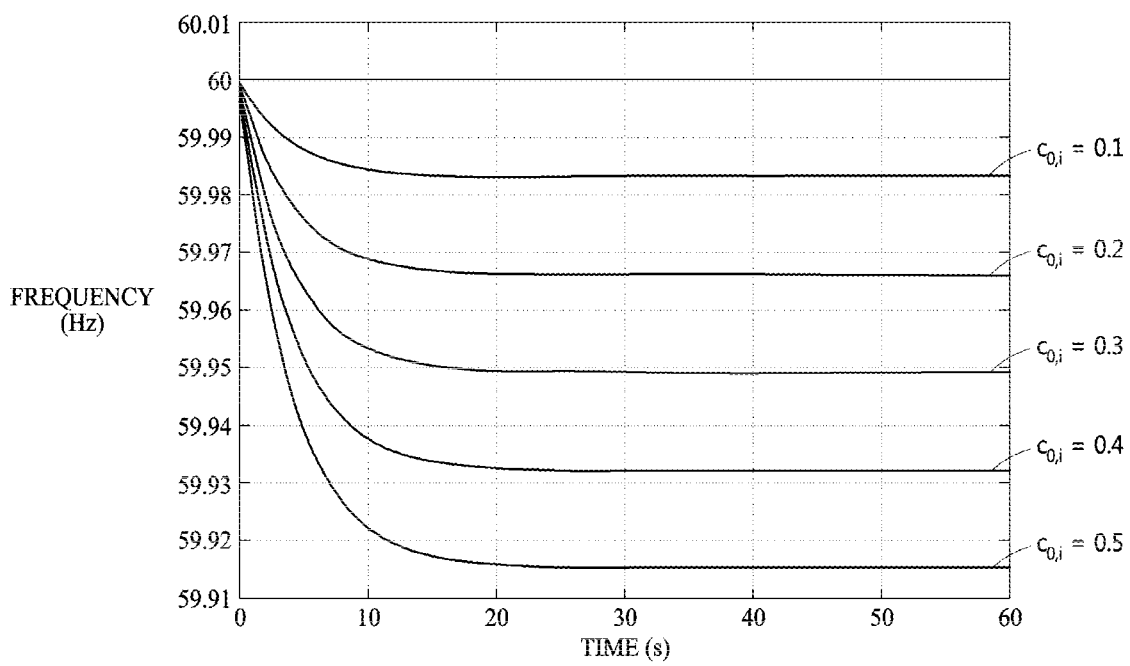
FIG. 5 is a graphic diagram comparing frequency differences along frequency adjustment contribution set values in a microgrid control system.

FIG. 5 is a graphic diagram comparing frequency differences along frequency adjustment contribution set values in a microgrid control system.

In the same manner with the aforementioned example, a microgrid frequency variation range may be set in ±0.1 Hz and a power transmission system frequency variation range may be set in ±0.5 Hz.

As shown in FIG. 4, frequency differences of the power transmission system between the case that a microgrid operates with a general droop control mode (the solid line) and the case that a microgrid operates with a systemic control mode (the dotted line) are shown when there is frequency fluctuation in the power transmission system. This comparison is exemplified in the condition when frequency degradation begins to occur due to power generation-load imbalance that is caused by omission of 600-MW-scale generator in the power transmission system.

During this, in the case that a general droop control mode causes the microgrids to consume active power regardless of frequency degradation in the power transmission system, it can be seen that the frequency is out of the power transmission system frequency variation range ±0.5 Hz. Differently, it can be seen that a systemic control mode results in allowing the frequency to be defined within the regulated variation range.

Additionally, as shown in FIG. 5, from a result of determining whether a microgrid frequency is defined within the regulated frequency variation range of the microgrid by diversifying a frequency adjustment contribution set value $C_o$ to 0.1, 0.2, 0.3, 0.4 and 0.5, it can be seen that the microgrid frequency stay uniformly in the range from 60 Hz to −0.1 Hz. As large as the contribution set value, the microgrid frequency slightly may decreases but an active power amount contributing to the power transmission system may increases.

A microgrid control system may be implemented as described above. A microgrid control method will be now described hereafter in conjunction with FIG. 6. The description duplicated with the aforementioned explanation will not be further provided hereafter.

Figure 6:
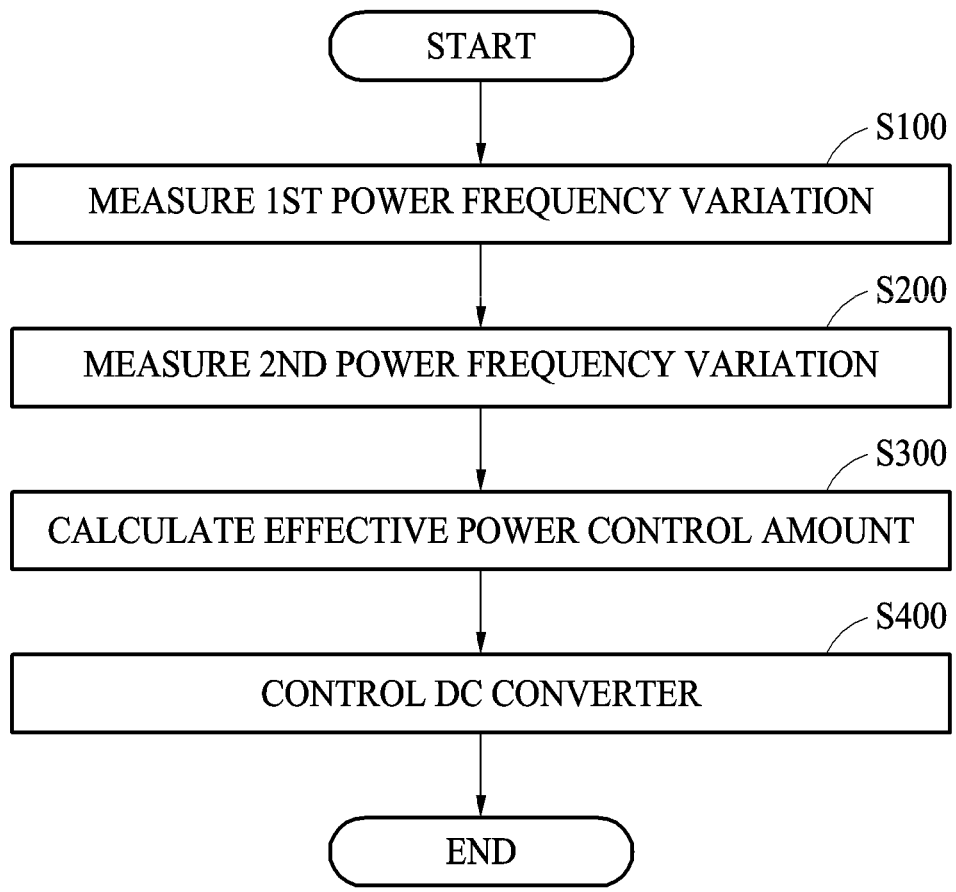
FIG. 6 is a flow chart showing a microgrid control method.

FIG. 6 is a flow chart showing a microgrid control method.

As shown in FIG. 6, a microgrid control method, performed by a converter control unit for controlling an active power amount supplied into a microgrid, may include steps of measuring a first power frequency variation amount of the microgrid (S100), measuring a second power frequency variation amount of a power transmission system (S200), calculating an active power control amount, which is to be supplied into the microgrid, by using the first power frequency variation and the second power frequency variation (S300), and controlling a DC converter with the active power control amount.

An active power frequency control amount may be calculated (S300) through Equation 2 and Equation 3 by measuring the first power frequency variation and the second power frequency variation (S100 and S200). The calculated active power frequency control amount may be used to control the DC converter (S400).

Accordingly, the microgrid control method may consider frequency fluctuation in a microgrid as well as in a power transmission system to decide an active power amount that is to be supplied into the microgrid, thus reducing a frequency adjustment reserve power that is secured against frequency fluctuation.

According to a microgrid control system, it may be allowable to reduce frequency adjustment reserve power that is secured against frequency fluctuation, by fairly deciding an active power amount, which is to be supplied to a microgrid, in consideration of a power transmission system and the microgrid together with respect to frequency fluctuation.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A microgrid control system, comprising:
   a power transmission system configured to supply power to a microgrid;
   the microgrid configured to receive power from the power transmission system and to supply power into at least one or more loads;
   a DC converter electrically connected to the power transmission system and configured to convert power that is supplied to the microgrid; and
   a converter control unit configured to measure a first value representing a variation in frequency of power at the microgrid and a second value representing a variation in frequency of power at the power transmission system, and to control active power that is transmitted to the microgrid by the DC converter based on the first value, the second value and a droop control invariable;
   wherein the droop control invariable is a function of a regulated frequency variation range of the microgrid and a regulated frequency variation range of the power transmission system; and
   wherein the converter control unit is configured to generate an active power control amount of the microgrid by Equation 1:

$$\Delta P = -\frac{1}{R}\Delta f_s + c_r D_s \Delta f_m$$

where ΔP denotes the active power control amount, R denotes an initial droop value, Δfs denotes the first value associated with the microgrid, Δfm denotes the second value associated with the power transmission system, and $c_r$ denotes a droop control invariable, and $D_S$ denotes a frequency-load characteristic invariable.

2. The microgrid control system of claim 1, wherein the converter control unit is configured to control the DC converter by droop control.

3. The microgrid control system of claim 2, wherein the converter control unit comprises:
- a first measuring module configured to measure a frequency variation of the microgrid;
- a second measuring module configured to measure a frequency variation of the power transmission system; and
- a storage module configured to receive and store an initial droop set value, a microgrid frequency-load characteristic invariable, and a droop control invariable of the microgrid.

4. The microgrid control system of claim 1, wherein the droop control invariable ($C_r$) is defined by Equation 2:

$$c_r = c_o \frac{\Delta f_s^{reg}}{\Delta f_m^{reg}}, \quad \text{[Equation 2]}$$

where $C_o$ denotes a frequency adjustment contribution set value, $\Delta f_s^{reg}$ denotes the regulated frequency variation range of the microgrid, and $\Delta f_m^{reg}$ denotes the regulated frequency variation range of the power transmission system.

5. A microgrid control method performed by a converter control unit, the method comprising:
- measuring a first value representing a variation in frequency of power at the microgrid; measuring a second value representing a variation in frequency of power at a power transmission system configured to supply power to the microgrid;
- calculating an active power control amount based on the first value, the second value, and a droop control invariable; and
- controlling operations of a DC converter using the active power control amount, the DC converter electrically connected to the power transmission system and configured to convert power supplied to the microgrid from the power transmission system;
- wherein the droop control invariable is a function of a regulated frequency variation range of the microgrid and a regulated frequency variation range of the power transmission system;
- wherein the calculating of the active power control amount comprises: calculating the active power control amount by Equation 1:

$$\Delta P = -\frac{1}{R}\Delta f_s + c_r D_s \Delta f_m$$

where ΔP denotes the active power control amount, R denotes an initial droop set value, Δfs denotes the first value associated with the microgrid, Δfm denotes the second value associated with the power transmission system, and cr denotes a droop control invariable, and $D_S$ denotes a frequency-load characteristic invariable of the microgrid.

* * * * *